United States Patent
Wachtendorf

(10) Patent No.: US 9,444,563 B2
(45) Date of Patent: Sep. 13, 2016

(54) WIRELESS AUDIO TRANSMISSION SYSTEM AND METHOD OF WIRELESS AUDIO TRANSMISSION

(71) Applicant: Sennheiser electronic GmbH & Co. KG, Wedemark (DE)

(72) Inventor: Sven Wachtendorf, Wedemark (DE)

(73) Assignee: Sennheiser electronic GmbH & Co. KG, Wedemark (DE)

(*) Notice: Subject to any disclaimer, the term of this patent is extended or adjusted under 35 U.S.C. 154(b) by 0 days.

(21) Appl. No.: 14/165,735

(22) Filed: Jan. 28, 2014

(65) Prior Publication Data
US 2014/0220904 A1 Aug. 7, 2014

(30) Foreign Application Priority Data
Jan. 31, 2013 (DE) .................. 10 2013 201 649

(51) Int. Cl.
H04B 17/24 (2015.01)
H04B 17/309 (2015.01)
H04R 29/00 (2006.01)

(52) U.S. Cl.
CPC .................................... H04B 17/24 (2015.01)

(58) Field of Classification Search
CPC .............................. H04B 17/24; H04S 7/301
See application file for complete search history.

(56) References Cited

U.S. PATENT DOCUMENTS

| | | | |
|---|---|---|---|
| 2004/0259554 A1* | 12/2004 | Rappaport | H04W 16/18 455/446 |
| 2005/0113021 A1 | 5/2005 | Gosieski et al. | |
| 2006/0212910 A1* | 9/2006 | Endres | H04H 20/63 725/73 |
| 2008/0036865 A1* | 2/2008 | Liu | 348/180 |
| 2008/0303956 A1* | 12/2008 | Nakagawa | H04N 5/44 348/723 |
| 2009/0052713 A1 | 2/2009 | Abe | |
| 2009/0189812 A1* | 7/2009 | Xia | H04B 7/0617 342/374 |
| 2010/0142735 A1* | 6/2010 | Yoon et al. | 381/303 |
| 2012/0127831 A1* | 5/2012 | Gicklhorn et al. | 367/118 |
| 2012/0177217 A1* | 7/2012 | Schmidt | H04L 1/0001 381/80 |
| 2012/0258751 A1 | 10/2012 | Koch et al. | |
| 2012/0263314 A1 | 10/2012 | Koch et al. | |
| 2012/0281848 A1* | 11/2012 | Koch et al. | 381/58 |

FOREIGN PATENT DOCUMENTS

| | | |
|---|---|---|
| DE | 10 2009 037 543 | 2/2011 |
| DE | 10 2009 046 544 | 5/2011 |
| DE | 10 2009 046 548 | 5/2011 |
| DE | 10 2009 052 297 | 5/2011 |

* cited by examiner

*Primary Examiner* — Cindy Trandai
(74) *Attorney, Agent, or Firm* — Frommer Lawrence & Haug LLP

(57) ABSTRACT

There is provided a wireless transmission system comprising at least one mobile transmitter for wireless audio transmission having a user interface. The wireless audio transmission system further has a stationary receiver for receiving the wireless audio transmission from the at least one mobile transmitter. The receiver has a receiving unit for wirelessly receiving the audio signals transmitted from the mobile transmitters. The stationary receiver also has an audio processing unit for performing audio processing of the audio signals received by the receiving unit and a sound check unit for analyzing the wireless audio signals received by the receiving unit. The stationary receiver further has a transmitter for transmitting at least parts of the analysis of the sound check unit to the mobile transmitters by way of a return channel.

4 Claims, 1 Drawing Sheet

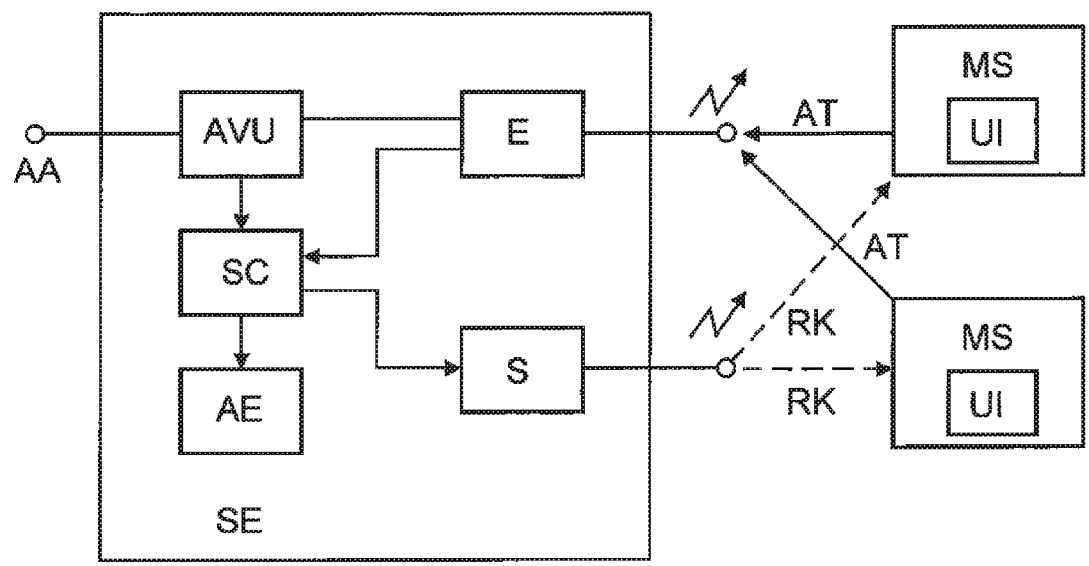

WIRELESS AUDIO TRANSMISSION SYSTEM AND METHOD OF WIRELESS AUDIO TRANSMISSION

The present application claims priority from German Patent Application No. DE 10 2013 201 649.2 filed on Jan. 31, 2013, the disclosure of which is incorporated herein by reference in its entirety.

FIELD OF THE INVENTION

The present invention concerns a wireless audio transmission system and a method of wireless audio transmission.

It is noted that citation or identification of any document in this application is not an admission that such document is available as prior art to the present invention.

Wireless audio transmission systems like for example wireless microphone systems typically have a stationary or mobile receiver, for example a stationary or mobile receiver, a camera receiver and at least one mobile transmitter (for example a wireless microphone or a pocket or bodypack transmitter or a plug-on transmitter). When installing or setting up a wireless microphone system it is necessary for example to check whether there are sufficient transmission frequencies. It is also necessary to check whether the transmission quality of the wireless audio transmission is everywhere adequate. In particular it is necessary to check by means of the mobile transmitter whether adequate transmission is possible at every possible position for the mobile transmitter.

In the German patent application from which priority is claimed the German Patent and Trademark Office searched the following documents: De 10 2009 037 543 A1; DE 10 2009 046 544 A1: DE 10 2009 046 548 A1; DE 10 2009 052 297 A1; US 2005/0113021 A1 and US 2009/0052713 A1.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of, any previously described product, method of making the product, or process of using the product.

SUMMARY OF THE INVENTION

An object of the present invention is to provide a wireless audio transmission system and a method of wireless audio transmission, which permits simplified set up or simplified sound check.

Thus there is provided a wireless audio transmission system (for example a wireless microphone system) comprising at least one mobile transmitter for wireless audio transmission with a user interface. The wireless audio transmission system further has a stationary or mobile receiver for receiving the wireless audio transmission from the at least one mobile transmitter. The stationary receiver has a receiving unit for wirelessly receiving the audio signals transmitted from the mobile transmitters. The stationary receiver further has an audio processing unit for carrying out audio processing of the audio signals received by the receiving unit and a sound check unit for analyzing the wireless audio signals received by the receiving unit. The stationary receiver further has a transmitter for transmitting at least parts of the analysis or the items of analysis information of the sound check unit to the mobile transmitters by way of a return channel.

According to the invention the items of analysis information transmitted by way of the return channel include channel quality data (RSSI—received signal strength indication) and/or link quality data LQI (link quality indicator).

In an aspect of the present invention analysis of the sound check unit involves an analysis of the reception quality of the wireless audio transmission and/or analysis of battery in formation from a mobile transmitter.

The wireless audio transmission system can be used to transmit both audio signals and also data signals. For that purpose the mobile transmitters can be adapted to wirelessly transmit data like for example items of battery information. The stationary or mobile receivers can be adapted to receive the wirelessly transmitted data signals.

In an aspect of the present invention the quality of the audio signal and of the reception signal can be represented in graph form in the mobile transmitter, for example by bar graphs.

The invention also concerns a method of wireless audio transmission. Wireless audio transmission from at least one mobile transmitter with a user interface is performed. The wireless transmission from the at least one mobile transmitter is received by a stationary or mobile receiver. Audio processing of the received audio signal is performed and the received wireless audio signal is analyzed in a sound check unit. At least a part of the analysis of the wireless audio transmission which was performed by the sound check unit is wirelessly transmitted. At least a part of the analysis of the wireless transmission (for example the RSSI and/or LQI data) is displayed on the user interface of the mobile transmitter in a sound check operating mode.

The invention concerns the notion of providing the items of information required for a sound check not only in the stationary receiver but also in or at the mobile transmitter. That can be effected for example by representing the corresponding data and items of information on a user interface on or in the wireless transmitter. Thus for example the frequency, reception strength, audio RSSI data (received signal strength indication), LQI data (link quality indication) and other parameters can be represented. During the sound check the wireless audio transmission can be optimized (for example in a sound check operating mode) by for example the antenna position being optimized or the installation location of the stationary receiver being adapted.

Further configurations of the invention are subject-matter of the appendant claims.

BRIEF DESCRIPTION OF THE DRAWINGS

FIG. 1 shows a schematic block circuit diagram of a wireless audio transmission system according to the invention.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill its the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

FIG. 1 shows a schematic block circuit diagram of a wireless audio transmission system according to the invention. The wireless audio transmission system has a stationary or mobile receiver SE and at least one mobile transmitter MS, for example a wireless microphone, in particular a wireless microphone system. The mobile transmitter MS transmits audio signals wirelessly to the stationary receiver SE. The stationary receiver has a receiving unit E for wirelessly receiving the audio signals wirelessly transmitted by the mobile transmitter MS, and an audio processing unit AVU for performing audio processing of the audio signals received by the receiving unit E. The audio signals can be transmitted in digital or analog form, for example by an HE (high frequency) or RF (radio frequency) transmission. The output of the data processing unit AVU can be coupled to an audio output AA so that the outputted audio data are either subjected to further audio processing or can be outputted. The stationary receiver SE further has a sound check unit SC and a transmitter S. The transmitter S serves to transmit data from the stationary receiver SE to the mobile transmitter MS by way of a return channel RK.

The sound check unit SC serves to carry out analysis or assessment of the audio transmission received by the receiving unit E. In that case the reception quality of the wireless audio transmission can be detected for example in the form of RSSI data (received signal strength indication) or LQI data (link quality indication), As an alternative thereto other methods for LQI (link quality indication) assessment (for example bit error rate measurement, CRC codec information) are also possible. The sound check unit SC can optionally detect the frequency of the wireless audio transmission. The sound check unit SC can optionally be adapted to extract battery information and further status data (for example AF level, type of capsule used or name) from the mobile transmitter MS, which is embedded in the audio transmission. The analysis performed by the sound check unit SC can be represented on a display unit AE of the stationary receiver. Alternatively or additionally thereto analysis of the sound check unit SC can be transmitted by means of the transmitter S to the mobile transmitter by way of the return channel. The mobile transmitter typically has a user interface UI (for example a display unit), where the analysis of the sound check unit SC can be displayed.

It is thus possible in a simple manner to provide that all data required for the sound check are represented not only in the stationary receiver SE but also on the mobile transmitter MS. Accordingly the user in performing the sound check receives a direct feedback in regard to reception quality RSSI, LQI and/or audio quality (and optionally further parameters) of the audio transmission. In that way the user can establish whether the audio transmission enjoys adequate reception quality at any position within the location of use. If that is not the case then the user can vary the placement of the receiving antennas of the stationary receiver SE.

The sound check unit SC or a sound check operating mode can be activated or deactivated. Typically the sound check unit is activated only upon installation of the wireless audio transmission system, for example when performing the sound check. As soon as the sound check is concluded the sound check unit SC can be deactivated again.

A sound check can be used for example to set up a wireless transmission path like for example a wireless microphone path in a wireless microphone system. During a sound check optionally both the audio quality and also the quality of the wireless transmission is checked. In that respect it is necessary to ensure that the wireless path functions in stable fashion within the area of use (for example stage, conference room). For that purpose all positions possible for the mobile transmitter MS should be tried out by means of the mobile transmitter MS. The data relating to the quality of audio signal and HF reception (radio frequency RF reception), that are available due to the described method, can be represented at the transmitter side at MS by means of a bar graph.

The audio transmission system means that an individual user can also carry out the sound check alone. Because the analysis performed by the sound check unit SC is transmitted by means of the return channel RK from the stationary receiver SK to the mobile transmitter MS the user who performs the sound check can receive at the mobile transmitter MS an indication in regard to the quality of the audio transmission, for example RSSI, LQI. That can be effected in real time so that the user has a direct feedback on performing the sound check.

In an aspect of this invention the sound check unit Sc can be activated to perform a sound check so that the wireless audio transmission function is in a sound check operating mode as soon as the sound check unit Sc is activated.

The items of information from the sound check unit SC, that are transmitted through the return channel RK, represent items of information in respect of channel quality (RSSI data (received signal strength indication)) or LQI data (link quality indication).

The mobile transmitters MS according to the invention can represent wireless microphones and/or pocket transmitters. In the case of a pocket or bodypack transmitter a microphone can be connected to the pocket transmitter or plug-on transmitter to wirelessly transmit the audio signals detected by the microphone. In a further aspect of the invention the mobile transmitters can also be adapted to wirelessly receive an audio transmission from a stationary or mobile unit. According to the invention it is also possible to use systems having a portable receiver (for example in-ear systems). A further area of use is camera systems, wherein a camera receiver is mounted on a video camera and can be used in combination with a portable transmitter.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A sound check system for a wireless audio transmission system in a conference room or on a stage, the sound check system comprising:

a mobile transmitter configured to wirelessly transmit audio signals, the mobile transmitter comprising:

a wireless microphone or a wireless pocket transmitter; and
a user interface; and
a stationary or mobile receiver configured to receive the wireless audio signals transmitted from the mobile transmitter;
wherein the receiver has:
a receiving unit configured to wirelessly receive the audio signals transmitted from the mobile transmitter;
an audio processing unit configured to process the audio signals received by the receiving unit;
a sound check unit configured to analyze the wireless audio signals received by the receiving unit to obtain analysis information, the analysis information including:
channel quality data of a quality of a wireless channel between the mobile transmitter and the receiver; and/or
link quality data of a quality of a wireless link between the mobile transmitter and the receiver; and
a transmitter configured to wirelessly transmit at least a part of the analysis information to the mobile transmitters by way of a return channel;
wherein the part of the analysis information transmitted by way of the return channel includes the channel quality data and/or the link quality data; and
wherein the user interface is adapted to display, in a sound check operating mode, the part of the analysis information that was transmitted.

2. The sound check system as set forth in claim 1;
wherein the analysis information includes data relating to a reception quality of the wireless audio signals and/or data relating to battery information from a mobile transmitter.

3. The sound check system as set forth in claim 2;
wherein the mobile transmitter is configured to display the data relating to the reception quality of the audio signals in graph form.

4. A method of performing a sound check in a wireless audio transmission, the method comprising the steps:
performing a wireless audio transmission from a mobile transmitter comprising:
a wireless microphone or a wireless pocket transmitter; and
a user interface;
receiving the wireless transmission from the mobile transmitter by a stationary or mobile receiver, via receiving antennas having a certain placement;
performing audio processing of the received audio signals;
analyzing the received wireless audio signals in a sound check unit to obtain analysis information, the analysis information including:
channel quality data of a quality of a wireless channel between the mobile transmitter and the receiver; and/or
link quality data of a quality of a wireless link between the mobile transmitter and the receiver; and
wirelessly transmitting at least a part of the analysis information by way of a return channel;
wherein the part of the analysis information transmitted by way of the return channel includes the channel quality data and/or the link quality data; and
wherein the method further comprises:
displaying the part of the analysis information that was transmitted on the user interface of the mobile transmitter in a sound check operating mode; and
optimizing the placement of the receiving antennas based on the displayed analysis information.

* * * * *